United States Patent
Khushu et al.

(10) Patent No.: US 7,415,272 B2
(45) Date of Patent: Aug. 19, 2008

(54) METHOD FOR IMPROVING DATA THROUGHPUT IN WIRELESS NETWORKS WITH SCHEDULABLE INTERRUPTIONS

(75) Inventors: Sanjeev Khushu, San Diego, CA (US); Ashutosh Joshi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 11/034,429

(22) Filed: Jan. 11, 2005

(65) Prior Publication Data

US 2005/0245253 A1 Nov. 3, 2005

Related U.S. Application Data

(60) Provisional application No. 60/567,257, filed on Apr. 30, 2004.

(51) Int. Cl.
*G01S 1/00* (2006.01)
(52) U.S. Cl. .................... 455/424; 455/119; 455/150.1; 370/468
(58) Field of Classification Search ................. 455/425, 455/434, 458, 428, 427, 119, 150.1, 424; 370/468
See application file for complete search history.

(56) References Cited

U.S. PATENT DOCUMENTS

| | | | |
|---|---|---|---|
| 6,201,499 B1 * | 3/2001 | Hawkes et al. ............. 342/387 |
| 6,256,477 B1 * | 7/2001 | Eidson et al. ............. 455/63.3 |
| 6,389,059 B1 * | 5/2002 | Smith et al. ............... 375/141 |
| 6,903,684 B1 * | 6/2005 | Simic et al. ............ 342/357.15 |
| 2002/0085521 A1 * | 7/2002 | Tripathi et al. ............. 370/335 |
| 2003/0036389 A1 * | 2/2003 | Yen ............................ 455/456 |
| 2003/0156664 A1 * | 8/2003 | Sahai et al. ................ 375/343 |
| 2004/0203844 A1 * | 10/2004 | Rajkotia ................. 455/456.1 |
| 2005/0037721 A1 * | 2/2005 | Benz et al. ............... 455/187.1 |
| 2005/0141464 A1 * | 6/2005 | Willey et al. ................ 370/337 |
| 2005/0197137 A1 * | 9/2005 | Radic et al. ............. 455/456.1 |
| 2006/0099957 A1 * | 5/2006 | Chung et al. ............. 455/456.1 |

* cited by examiner

*Primary Examiner*—George Eng
*Assistant Examiner*—Brandon J Miller
(74) *Attorney, Agent, or Firm*—Richard A. Bachand; Linda G. Gunderson; Thomas R. Rouse

(57) ABSTRACT

Data throughput functionality is improved in a network which supports high data rate applications and additional applications within a single receiver. Guidelines for tuning the receiver at variable time periods to avoid timeouts and fill radio link holes which result from non-received/unrecognized data are provided in connection with an algorithm of operation.

32 Claims, 4 Drawing Sheets

TIME/SEQUENCE GRAPH

METHOD FOR IMPROVING DATA THROUGHPUT IN WIRELESS NETWORKS WITH SCHEDULABLE INTERRUPTIONS

CROSS REFERENCE TO RELATED APPLICATION

This application claims priority from copending provisional patent application Ser. No. 60/567,257, filed Apr. 30, 2004.

BACKGROUND

Several schemes for determining one's geographic position are available. For example, one way to determine position involves the use of the global positioning system (GPS). The GPS was originally conceived and developed by the U.S. Department of Defense as a military navigation system. Over time, elements of the system have become increasingly available for civilian use.

The GPS uses a constellation of 24 satellites, in a geostationary orbit, whereby position can be determined by timing satellite signal journeys from a GPS satellite to a GPS receiver. Five spare orbiting satellites are provided primarily for backup in case one of the 24 satellites fail.

The satellites transmit spread-spectrum signals on two frequency bands (carrier frequency L1 at 1575.42 MHz and carrier frequency L2 at 1227.6 MHz). The GPS signals are contained within two frequency bands 20.46 MHz wide (+/−10.23 MHz) centered about L1 and L2.

The navigation information from each GPS satellite is transmitted on two subcarrier frequencies that are modulated by two pseudo-random noise codes on L1 and L2. One subcarrier modulated on L1 operates at 1.023 MHz using an open code called a coarse/acquisition (C/A) code allowing less precise navigation for civilian applications. The other subcarrier modulated on L2 operates at 10.23 MHz using a high precision (P) secure code for military navigation systems. Additionally, the GPS signal is modulated with a data message commonly referred to as the GPS navigation message.

Typically, a GPS receiver employs a trilateration scheme to obtain a position fix. For instance, a GPS-derived position can be accomplished using two-dimensional trilateration. Ordinarily, signals from three satellites can be used to determine position based on the intersection of three intersecting circles. More specifically, each satellite signal can provide a radius in which the GPS receiver can lie. Two intersecting radii allow the position determination to be narrowed to the area of intersection. Another satellite signal can provide a third radius indicative of the position of the GPS receiver, since all three radii should intersect at a single point. Expanding the forgoing concept to three-dimensional trilateration, each satellite signal can be used to indicate a sphere, whereby three intersecting spheres can used to determine position which includes altitude information. More satellite signals can be used, and typically are used, to improve accuracy.

At the GPS receiver, the satellite signal is demodulated after it is matched and synchronized with a pseudo-random noise code. The GPS receiver uses the GPS navigation message to calculate satellite signal transit times in addition to the coordinates of the GPS satellite. Position measurement by a GPS receiver can typically be accomplished within 15 meters (50 feet).

The GPS system has a variety of uses with today's mobile communications systems, especially with those employing code division multiple access (CDMA). In CDMA systems multiple users are allowed to simultaneously use common data streams, called channels, for transmission of information.

User information in transmitted signals is distinguished by pseudo-random patterns called codes. Transmitted information can be recovered by a receiver so long as the pseudo-random patterns used by the transmitter are known by the receiver. The signal containing the information to be transmitted is sent at low power, and the bandwidth of the information contained in the transmitted signal is spread according to a code. Such spread spectrum communications limit interference among users by making the transmitted signals appear similar to random noise and thereby difficult to demodulate by other than the intended receiver.

The forward communication link from a base transceiver station (BTS) to a mobile station uses the pilot, sync, paging and traffic communication channels to transmit voice and control data to the mobile station. The mobile station may comprise, for example, a mobile phone, a personal digital assistant with wireless communications capability, a portable computer with wireless communications capability, a pager or other personal communications device.

The BTS may comprise one or more transceivers placed at a single location. Together with a base station controller (BSC) that forms part of the base station terminating the radio communication path with the mobile station, the BTS is connected to an associated mobile switching center (MSC). The MSC is a system that automatically provides switching between user traffic from a wireless network and a wireline network or other wireless networks. A base station controller (BSC) which interacts with the MSCs and the BTSs provides a control and management system for one or more BTSs.

On the reverse communication link from the mobile station to the BTS, access and traffic channels are used to transmit voice and control data.

A CDMA system digitally encodes voice using Code-Excited Linear Prediction (CELP). Consequently, a CELP decoder and CELP encoder are located at the BSC and the mobile stations.

Encoders and interleavers are built into the BTSs and mobile stations to build redundancy into the transmitted signals to aid in recovery of lost information during transmission.

Encoded information is spread over the bandwidth of a CDMA channel in a process known as channelization. Channelization on the forward link channels involves modulating the transmitted signal according to a Walsh function code, followed by modulation by a pair of pseudo-random sequences. Channelization on the reverse link involves encoding the transmitted signal with a different pseudo-random code assigned to each mobile station in the system.

A radio frequency (RF) chain is a sequence of hardware blocks and associated software that is needed to receive and decode a radio signal. For example, an RF chain may consist of an antenna, a demodulator and a signal processing entity. RF chains have the property that they can receive and decode radio signals in specific frequency ranges only. That is, if an RF chain is tuned to a particular frequency, it will not be able to receive on another frequency. A single radio frequency (RF) chain may be used by both CDMA and GPS operations.

For proper GPS functionality, the mobile station is often required to tune-away from the CDMA carrier frequency to the GPS carrier frequency. High speed data traffic is supported by allocating additional bandwidth on supplemental channels (SCH) on demand for a higher data rate. CDMA and GPS operation share the single RF chain in a time-multiplexed fashion. When GPS operation is active, no CDMA operations are allowed and vice-versa.

In a shared RF environment, with frequent and long mobile station receiver tunings from the CDMA carrier frequency to the GPS carrier frequency, interruptions to the high speed data stream on the supplemental channel severely impact data throughput. The term "tune-away" is used hereinafter to refer to the tuning of the mobile station from the CDMA frequency to the GPS frequency.

The data transfer usually occurs between the mobile station and its peer connected by the CDMA network. Typically, both the mobile station and the peer follow the Transport Control Protocol (TCP) as a transport layer protocol utilizing the services provided by the wireless network. Data from the TCP server to the mobile station is carried by the network over a Data Link layer.

The Radio Link Protocol (RLP) is a feature of this Data Link layer designed to provide added reliability to an inherently error-prone wireless medium. Specifically, if data sent at the RLP layer is not received at the mobile station, an RLP error is flagged causing a signaling message to be sent to the network and a retransmission of the unacknowledged data follows.

At the TCP layer, most TCP implementations recognize the arrival of a number of duplicate acknowledgements (typically 3) to be an early indication of a packet drop, and retransmit the packet immediately. Simultaneously, the TCP layer reduces the maximum number of packets it sends in a given time, thus reducing the throughput on the link.

It may also happen that a packet may not be acknowledged at all and the TCP layer shall encounter a timeout. This is a positive indication of packet loss, and the TCP layer takes severe action, reducing its sending rate to the minimum. Further it increases the expected timeout values for this link exponentially. Thus, successive retransmissions occur with exponential delay and take place at a time when the throughput of the link is at its lowest.

With TCP as the transport protocol, timeouts and retransmissions can degrade data throughput by more than 90%. Since most data applications use TCP as the transport protocol, and because the impact on response time (throughput) is so severe, data applications cannot operate while GPS is active. Further, allowing GPS to proceed after the data operation has finished can severely impact GPS performance, as well. The GPS position fix will be delayed by the time taken to complete the data transaction, causing the GPS time to fix (TTF) to be unbounded, thereby making it impossible to get GPS position fixes in certain scenarios.

This problem has been noticed in conjunction with testing a mobile station based tracking system during a tracking session in a user network. In conjunction with a mobile station attempting to download data content from a network while the mobile station-based position fixes were in progress, it would take typically anywhere from 1 to 30 seconds to download approximately 2500 bytes of data. Since the application timeouts (the time during which an application fails due to non-responsiveness at either the client or server side of an application) may be typically 30 seconds, the CDMA data application is not able to operate properly. Further, such high response times are not acceptable for many real time data applications.

Conventionally, in addressing the GPS/data throughput problem, SCH transactions have been given a higher priority by blocking GPS operations until pending SCH transactions are completed. However, blocking a GPS visit affects the GPS time to fix (TTF). TTF is the time required to determine the position of the mobile station. Consequently, the TTF can be a function of the data activity occurring on a SCH.

Tuning the mobile station continuously to the CDMA carrier frequency in order to carry out SCH transactions will likely result in the GPS visit being significantly delayed. Should the mobile station be performing GPS tracking fixes while an application is attempting simultaneously to download CDMA data, the data download will fail. Consequently, data throughput will be very low, and it may sometimes take a significantly long time to download application data. With increased TTF, depending upon the SCH transaction duration, it is possible that a GPS session can timeout without a single GPS visit. Further, reduced data throughput and possible data application timeouts can occur while GPS tracking sessions are in progress.

There are three primary reasons for bad data throughput involving GPS and CDMA. 1) Tune-away from CDMA results in the loss of radio link protocol (RLP) data frames. The loss depends upon the amount of data exchanged and the time the mobile station spends on the new GPS frequency. The time spent on the GPS frequency is typically from 0.1 to 2 seconds (sec). 2) Tune-away results in loss of the Enhanced Supplemental Channel Assignment Message (ESCAM). Consequently, the mobile station will not receive data on the Supplemental Channel (SCH) even when the mobile station is tune to CDMA. 3) The subsequent tune-aways do not allow previously lost data to be recovered. This results in the loss of newly transmitted/re-transmitted data packets.

When a loss occurs of RLP data that cannot be recovered, the tune-aways result in frequent errors at the TCP layer. Complete RLP data frames can be lost. The extent of the loss of this information depends upon the amount of data sent and the time spent by the mobile station while it is tuned to other than the CDMA carrier frequency. In the case of tune-aways to the GPS carrier frequency, times of 0.1 to 2 seconds are typical.

The MSC signals the mobile station that it should prepare to receive a data burst by transmitting an Enhanced Supplemental Channel Assignment Message (ESCAM). In this message, the MSC indicates the number of channel codes, as well as the actual Walsh codes to be used for each channel.

During tune-aways, the ESCAM is lost. Without the ESCAM, the mobile station will not be able to decode data on an SCH, even when the mobile station is tuned to the CDMA carrier frequency. Subsequent tune-aways do not allow previously lost data to be recovered, and also result in the loss of new transmitted/retransmitted packets of data. Because there is a finite probability of losing even the TCP server re-transmissions, the resulting delays in retransmissions, i.e., "backoffs" are nearly exponential and have a drastic impact on throughput.

FIG. 1 illustrates a time sequence graph (TSG) of a conventional network attempting CDMA high data rate functionality together with GPS positioning capability. Time is shown in hour, minute, and second format (hh:mm:ss) on the horizontal axis, while the data packet sequence number according to the RLP is indicated on the vertical axis. The solid line represents data transmissions to the mobile station. "R" designated above this line is representative of a retransmission of data. The dotted line signifies the acknowledgement of data received. A flat plot indicates that data is not being sent or received, as the case may be. Sloped lines indicate the successful transmission and reception of data.

The data shown in FIG. 1 was compiled while downloading data to a mobile station while GPS sessions were active on the mobile station. The plots show frequent periods where no data is being downloaded by the mobile station because of the loss of TCP re-transmitted packets and large back-off times.

SUMMARY

A method and system is disclosed herein in which data throughput functionality is improved in a wireless network that supports multiple applications within a single receiver. Guidelines for tuning the receiver at variable time periods to avoid timeouts and fill radio link holes which result from non-received/unrecognized data are provided in connection with an algorithm of operation.

Particularly, in one embodiment, a method for operating a mobile station comprises tuning the mobile station to a first carrier frequency pursuant to a radio link protocol, monitoring data transactions on the first frequency pursuant to the radio link protocol involving the mobile station, receiving at the mobile station a request for information modulated on a second carrier frequency; and tuning the mobile station to the second carrier frequency in connection with a plurality of time periods measured during the request for information and during the data monitoring. The monitored data may be digital information transmitted on spread spectrum signals modulated on the first carrier frequency using techniques such as code division multiple access or time division multiple access. In some embodiments data may also be monitored on a supplemental channel. The second carrier frequency may be modulated with a global positioning signal, which is used to determine the position of the mobile station.

DETAILED DESCRIPTION

The foregoing problem of GPS session timeout are addressed by simultaneous GPS sessions and CDMA data transmissions using a single RF chain. An algorithm of operation should allow simultaneous GPS and CDMA data operations, without significantly affecting data throughput or GPS TTF performance. Such algorithm is described in which the mobile station tunes its receiver to the CDMA carrier frequency after having been tuned to another carrier frequency, (i.e. "tune-back), such as the GPS carrier frequency. The time during which the mobile station is "tuned-back" is variable, as compared with conventional systems wherein such times are fixed. This allows adverse impact on both GPS and CDMA data performance due to changing carrier frequencies to be minimized.

Herein, CDMA activity of a data channel, such as a supplemental channel, is monitored. The variable CDMA tune-back time is determined in connection with monitoring the data activity at the RLP layer. Should an application require a tune-away within in a certain period of time, the algorithm described herein can accommodate this need by allowing the tune-away. For instance, in the case of a GPS application, if a position fix is required in a certain period of time, the tune-away can be scheduled to meet this deadline.

Figure 2:
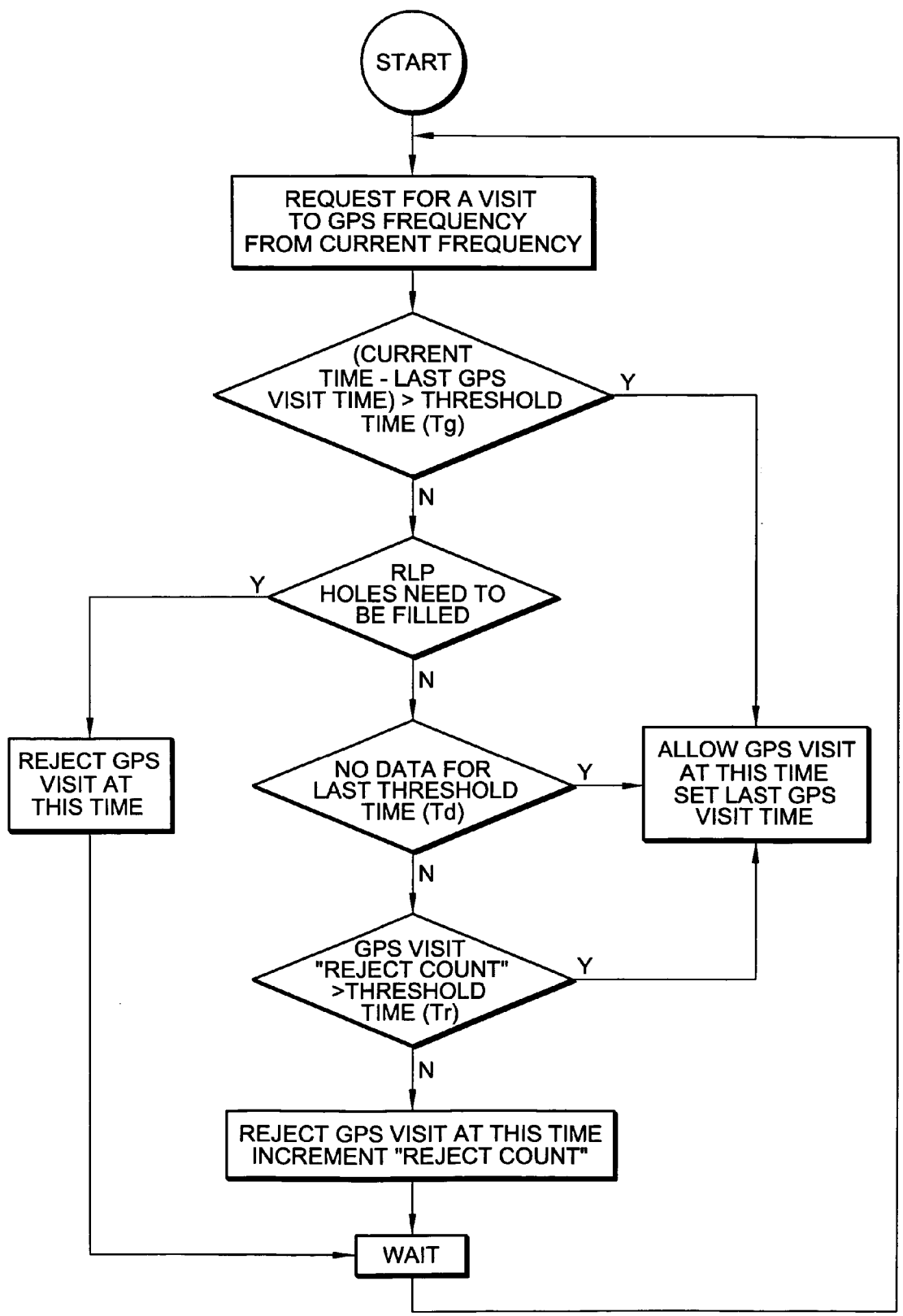
FIG. 2 is a flow chart depicting a method of communication operations.

FIG. 2 is a flow chart depicting a method of communication operation. For purposes of explanation, the tune-away carrier frequency is assumed to be that of the GPS carrier frequency. However, applications outside of the GPS are contemplated, and, accordingly, other carrier frequencies can be used. According to the methodology presented in FIG. 2, when data is expected on the forward link, the GPS tune-away should be delayed to the extent that the GPS functionality is not severely impacted. Additionally, tune-aways are delayed for a time period long enough to allow lost data, due to previous tune-aways, to be recovered. This delay is limited to the extent that it would adversely affect an application such as a required GPS fix.

Thus, tune-aways of the mobile station from the CDMA carrier frequency to another carrier frequency are delayed by a time, Tr, in connection with the receipt of data. With reference to FIG. 2, an application requiring a GPS position determination requests that the mobile station tune to the GPS carrier frequency. This is referred to as a request for a "visit" to the GPS frequency. The flow chart assumes that the mobile station is initially tuned to the CDMA carrier frequency. A GPS delay timeout value is known. The GPS delay timeout value is a function of the maximum time that proper GPS functionality can tolerate between visits and the minimum time required to fill RLP holes as well as receive new data. The concept of RLP holes is explained with reference to FIG. 2.

Figure 3:
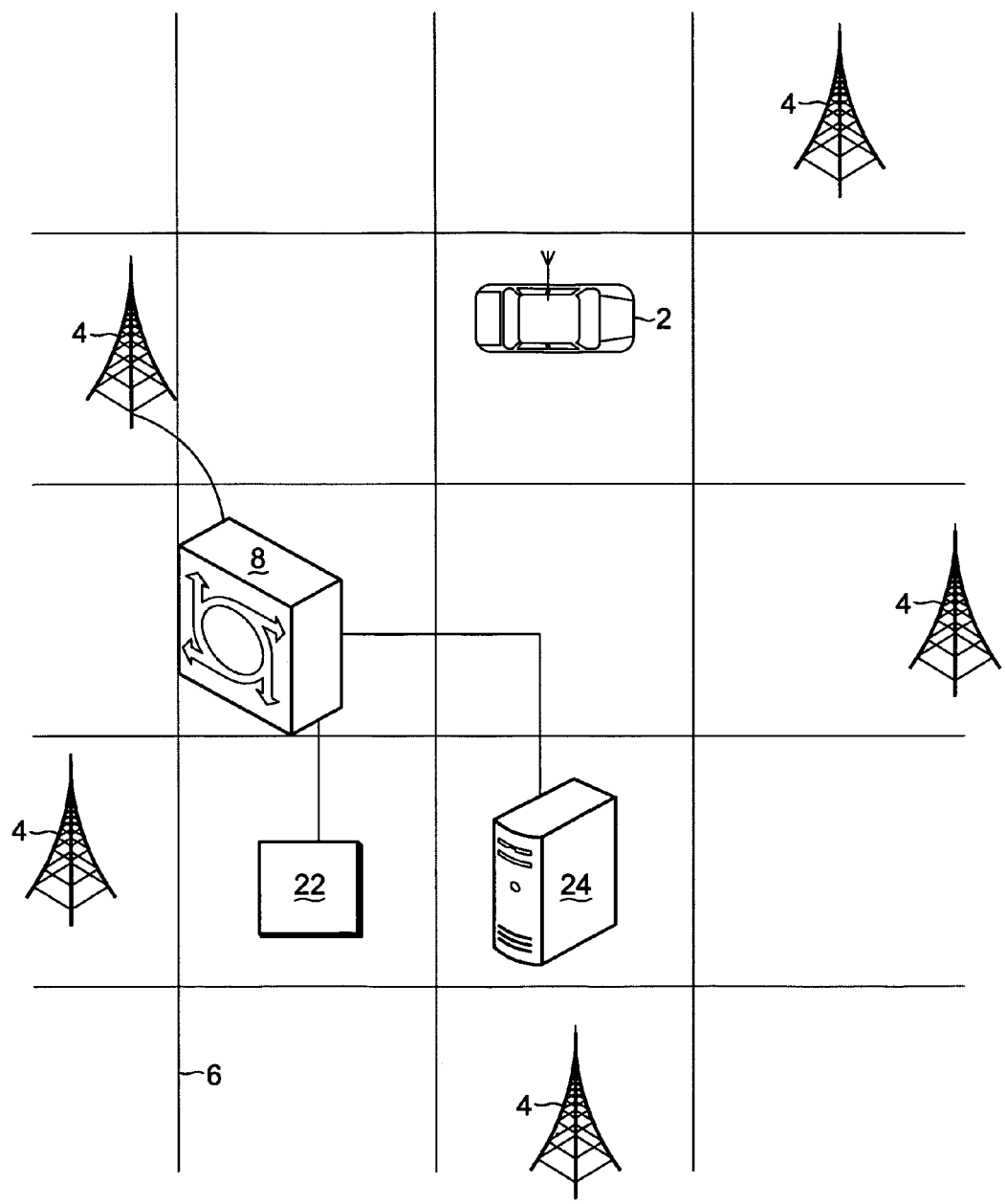
FIG. 3 is a diagram representative of a communications network, showing a mobile station surrounded by base station towers.

Representative of a network, FIG. 3, to which reference is now additionally made, is a diagram depicting mobile station 2, such as a vehicle with an antenna, surrounded by base station towers 4. MSC 8 is coupled to TCP server 24. When TCP packet data is directed to mobile station 2 through MSC 8 and base station towers 4, an acknowledgement referencing the RLP-defined data packet sequence numbers is sent back to server 24 through the network upon recognition and receipt of the packets.

Figure 1:
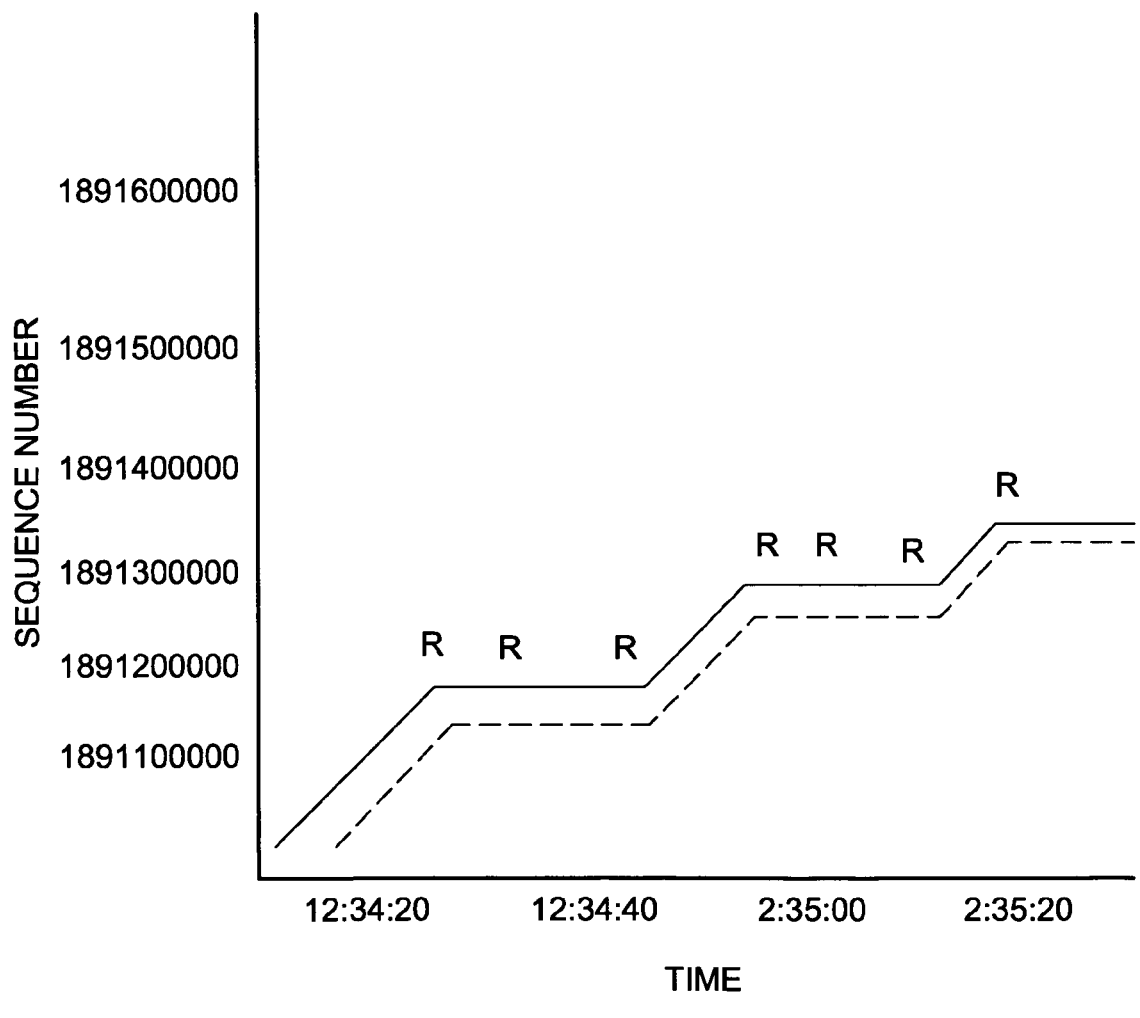
FIG. 1 is a time sequence graph (TSG) of a conventional network attempting CDMA high data rate functionality together with GPS positioning capability.

RLP holes are the unacknowledged packets of data that the mobile station fails to receive and/or decode. Memory 22 provides data packet storage capability to MSC 8 in order to effect data retransmissions to fill RLP holes. With reference again to FIG. 1, the GPS delay timeout value, Tg, should accommodate the following: the time required for the mobile station to get data and send an acknowledgement, i.e. the round trip time (RTT); the time to recover lost data; and the maximum time the GPS can be rejected due to data, Tr. Simulation and experimental testing reveal this timeout value in one system to be approximately 5 seconds for tune-aways of approximately 2 seconds.

In connection with a request for a GPS visit, should the difference between the current time and the most recent GPS visit exceed the Tg value, the GPS visit is allowed to proceed. The time at which the GPS visit occurs is stored in a memory which preferably is resident at the mobile station. This value is updated at each GPS visit.

Should the difference between the current time and the most recent GPS visit not exceed the Tg value, a decision must be made as to whether RLP holes need to be filled. If RLP holes need to be filled then the GPS visit is rejected. If no RLP holes need to be filled then a determination must be made as to data has been received during a time period which exceeds a predetermined value Td. Td can be chosen in conjunction with monitoring the data activity on the supplemental data channel. Its value should be chosen as a short enough period of time so as to avoid unnecessarily delaying the GPS visit.

If data on the supplemental channel has been inactive for a period of time Td, the GPS visit is allowed to proceed. When the inactivity time period Td has not been exceeded the time during which the GPS visit has been delayed, i.e. "the reject count," is compared with the maximum time the GPS can be rejected due to data, Tr. Should the "reject count" exceed the threshold of Tr the GPS visit is allowed. Otherwise, the visit is refused and period of time for which a GPS visit is refused is stored at the mobile station, i.e., the "reject count" is "incremented"-that is updated and stored at the mobile station. Thereafter, the mobile station awaits the next visit request.

Table 1 illustrates pseudo code for a proposed algorithm implementing a methodology according to the foregoing flowchart of FIG. 2. The algorithm can be run whenever there is a GPS request. Current standards dictate a GPS request every 80 milli-seconds (msec) after the scheduled completion of a CDMA session.

TABLE 1

Algorithm:
if ( no GPS for last Tg time )
{ allow GPS to proceed; } Comment: visit after long time/ already rejected for Tg, so allow GPS now
else if ( RLP holes to be filled )
{ reject GPS } Comment: Allow RLP to fill holes because of last tune-away
else if (No Data received in last Td msec )
{ allow GPS; } Comment: since currently there was no data activity, so schedule gps now
else if (GPS rejected because of Data for Tr ms)
{ allow GPS; }Comment: Don't reject GPS for more than Tr ms because of incoming data, so allow it
else { reject GPS; increment Tr ms count} Comment: More data expected, delay next visit for max Tr ms
Tg = GPS delay timeout. The value should be a function of, maximum time GPS can tolerate in between visits and minimum time required to fill RLP holes and receive some new data ( > RTT + Time to recover lost data + Tr). Based on simulations and lab results, Tg = 5 seconds is appropriate for Tune-away of 2 seconds. Increasing Tg beyond a certain value (> ~5 sec) has no significant impact on GPS and Data performance.
Tr = Maximum GPS reject time due to data. The value should be chosen such that impact on GPS TTF because of data activity is minimal. It is estimated that Tr should be about 1.5 sec. Increasing Tr beyond > ~1.5 sec doesn't increase data throughput proportionally. So in order to limit the impact on GPS TTF, Tr should be set to a value between 1.0 and 1.5 sec.
Td = Data in-activity timer. This timer should be a low value to avoid un-necessary delay of GPS tune-aways. It is estimated that Td should be about ~300 ms.

Figure 4:
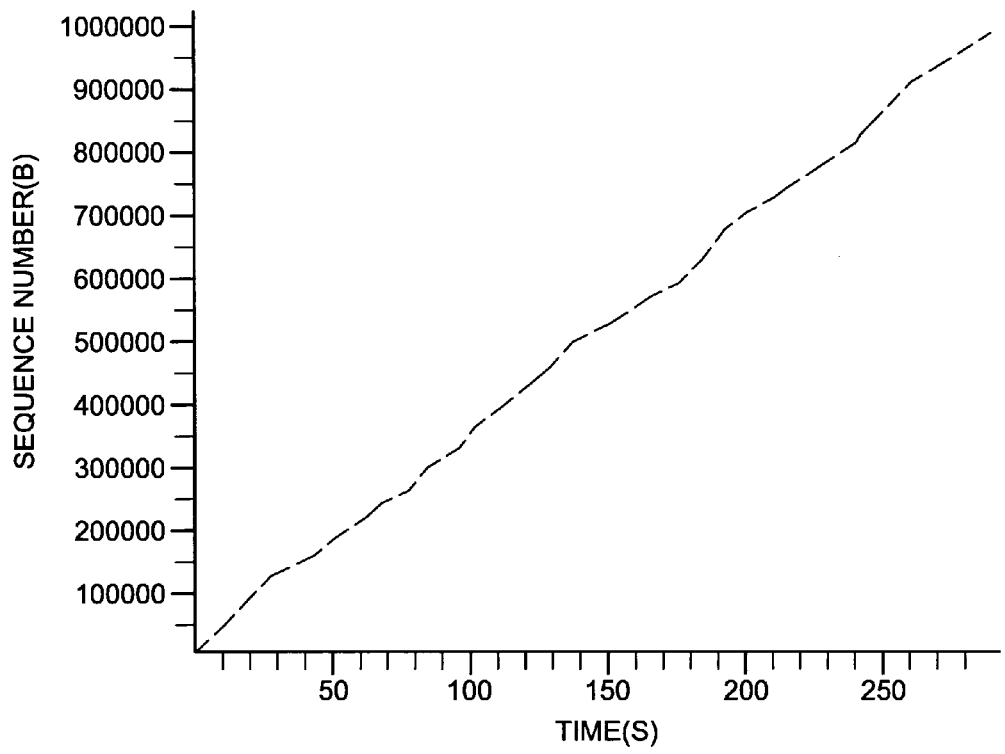
FIG. 4 is a time sequence graph of a transmission profile from a TCP server to a mobile station for an experimental network implementing an algorithm according to one embodiment of the invention.

FIG. 4, to which reference is not additionally made, is a time sequence graph of a transmission profile from a TCP server to a mobile station for an experimental network implementing the algorithm according to a preferred embodiment. As shown the line profile is sloped with very limited periods of back-offs.

Figure 5:
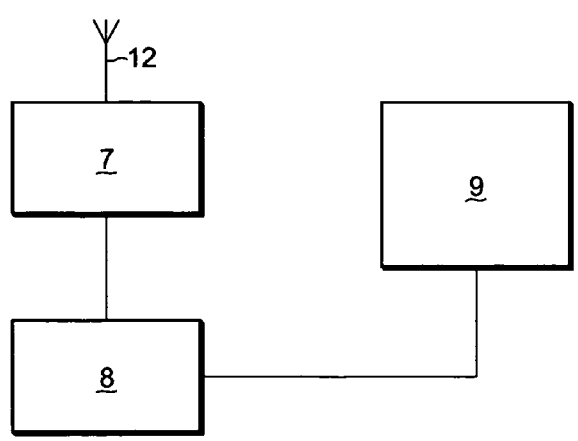
FIG. 5 is a block diagram layout of mobile station.

The ability to delay the GPS visit, tune-away to GPS, and establish and/or make comparisons with the foregoing described threshold values, Tg, Td, and Tr arises by way of this functionality being built into the mobile station. FIG. 5, to which reference is now additionally made, is a block diagram layout of mobile station 2 which includes radio frequency (RF) section 7 and processor 8. The foregoing algorithm described in connection with FIG. 2 is programmed in memory 9 according to software programming methodology similar to that described in TABLE 1. This software is executed by processor 8. RF section 7 provides a communication link through antenna 12 to the communications network shown and described with respect to FIG. 3.

Although the preferred embodiments herein have been described with reference to particular examples, it is to be understood that these examples are merely illustrative of the principles and applications present. For instance, the foregoing has applicability to any receiver requiring tuning from carrier having high speed data to another wherein receipt of packet information can be critical. It is therefore to be understood that numerous modifications may be made to the illustrative embodiments and that other arrangements may be devised without departing from the spirit and scope of the embodiments as defined by the appended claims.

The following entities/principles are substantially always present in any wireless network and have a one to one correspondence to concepts heretofore introduced.

A radio link protocol layer: This layer exists in all wireless networks to prevent the usual radio losses from deteriorating throughput drastically. Such a layer comprises a Selective Automatic Repeat Request Mechanism (S-ARQ) means that the two entities on either end maintain a finite sized buffer of transmitted/received packets and may request the other for any missed packets. This is usually done similar to the acknowledgement scheme described earlier in the document for RLP. This layer in fact parallels the RLP layer described.

A channel grant mechanism for high data throughputs: All wireless networks that provide high data rates support a mechanism similar to the SCH grant mechanism described earlier. Packet data is noisy and bursty in nature and thus, it is not economical to reserve bandwidth for it for the entire duration of a session. Instead, if the requirements increase, additional capacity is allocated and its availability is signaled to the mobile station by a means similar to the ESCAM signaling described herein.

Since the concepts are directly portable to a wide variety of wireless networks, the system and method may be usable across a number of wireless infrastructures—not just RLP on CDMA and for a number of applications—not just GPS on CDMA.

The invention claimed is:

1. A method for operating a mobile station comprising: tuning said mobile station to a first carrier frequency pursuant to a radio link protocol; monitoring data transactions on said first carrier frequency pursuant to said radio link protocol involving said mobile station; receiving at said mobile station, a request for information that is modulated on a second carrier frequency; measuring one or more time periods during said data monitoring; tuning said mobile station to said second carrier frequency after a variable time period following said receipt of said request, said variable time period being selected responsive to a function of at least one of said one or more measured time periods, wherein at least one of said one or more measured time periods is selected from a group consisting of: a first measured time period comprising a lapse of time between said request for information on said second carrier frequency and a previous request for information on said second carrier frequency, and a second measured time period comprising a period of time elapsed since receiving said request and a pre-determined maximum time the second carrier frequency can be rejected.

2. The method of claim 1 wherein said data transactions comprise transactions of digital information transmitted on spread spectrum signals modulated on said first carrier frequency.

3. The method of claim 1 wherein said data transactions comprise transactions of digital information transmitted on spread spectrum signals modulated according to a method of code division multiple access on said first carrier frequency.

4. The method of claim 3 further comprising monitoring data transactions on a supplemental channel, and selecting said variable time period at least partially based on said monitoring of said data transactions on said supplemental channel.

5. The method of claim 1 wherein said data transactions comprise transactions of digital information modulated according to a method of time division multiple access on said first carrier frequency.

6. The method of claim 1 wherein said at least one or more measured time periods comprises:
a period of time during which there is an absence of data activity involving said mobile station pursuant to said radio link protocol.

7. The method of claim 1 wherein said mobile station is tuned to said second carrier frequency in response to said lapse of time between said request for information on said second carrier frequency and a previous request for information on said second carrier frequency exceeding a first threshold time period.

8. The method of claim 7 wherein said first threshold time period is no greater than five seconds.

9. The method of claim 6 wherein said mobile station is tuned to said second carrier frequency in response to said period of time during which there is an absence of data activity involving said mobile station pursuant to said radio link protocol exceeding a second threshold time period.

10. The method of claim 9 wherein said second threshold time period is about 300 milliseconds.

11. The method of claim 1 wherein said mobile station is tuned to said second carrier frequency in response to said period of time elapsed since receiving a request for information modulated on said second carrier frequency and the pre-determined maximum time the second carrier frequency can be rejected exceeding a third threshold time period.

12. The method of claim 11 wherein said third threshold time period is between about 1.0 and 1.5 seconds.

13. The method of claim 1 wherein said second carrier frequency comprises a carrier frequency on which a global positioning signal is modulated.

14. The method of claim 13 wherein said mobile station is tuned to said second carrier frequency in response to said lapse of time between said request for information on said second carrier frequency and a previous request for information on said second carrier frequency exceeding a first threshold time period.

15. The method of claim 13 wherein said mobile station is tuned to said second carrier frequency in response to said period of time during which there is an absence of data exceeding a second threshold time period.

16. The method of claim 13 wherein said mobile station is tuned to said second carrier frequency in response to said period of time elapsed since receiving a request for information modulated on said second carrier frequency and the tuning of said mobile station to said second carrier frequency exceeding a third threshold time period.

17. A mobile station comprising:
an antenna;
a radio frequency section for providing a communications link to a communications network through said antenna; and
a processor programmed to tune said mobile station to a first carrier frequency pursuant to a radio link protocol, monitor data transactions pursuant to said radio link protocol, receive a request for information that is modulated on a second carrier frequency, measure one or more time periods during said data monitoring, and tune said mobile station to said second carrier frequency after a variable time period following said receipt of said request, said variable time period being a function of at least one of said one or more time periods measured by said processor,
wherein at least one of said one or more measured time periods is selected from a group consisting of:
a first measured time period comprising a lapse of time between said request for information on said second carrier frequency and a previous request for information on said second carrier frequency, and
a second measured time period comprising a period of time elapsed since receiving said request and a pre-determined maximum time the second carrier frequency can be rejected.

18. The mobile station of claim 17 wherein said data transactions comprise transactions of digital information transmitted on spread spectrum signals modulated according to a method of code division multiple access on said first carrier frequency.

19. The mobile station of claim 18 wherein at least some of said data transactions are monitored on a supplemental channel.

20. The mobile station of claim 17 wherein said second carrier frequency comprises a carrier frequency on which a global positioning signal is modulated.

21. The mobile station of claim 17 wherein said data transactions comprise transactions of digital information modulated according to a method of time division multiple access on said first carrier frequency.

22. A communication system comprising: a base station and a mobile station, said mobile station including an antenna, a radio frequency section for providing a network communication link between said mobile station and said base station via said antenna, and a processor programmed to tune said mobile station to a first carrier frequency pursuant to a radio link protocol, monitor data transactions pursuant to said radio link protocol, receive a request for information modulated on a second carrier frequency, measure one or more time periods during said data monitoring, and tune said mobile station to said second carrier frequency after a variable time period following said receipt of said request, said variable time period being a function of at least one of said one or more measured time periods, wherein at least one of said one or more measured time periods is selected from a group consisting of: a first measured time period comprising a lapse of time between said request for information on said second carrier frequency and a previous request for information on said second carrier frequency, and a second measured time period comprising a period of time elapsed since receiving said request and a pre-determined maximum time the second carrier frequency can be rejected.

23. The communication system of claim 22 wherein said data transactions comprise transactions of digital information transmitted on spread spectrum signals modulated according to a method of code division multiple access on said first carrier frequency.

24. The communication system of claim 23 wherein at least some of said data transactions are monitored on a supplemental channel.

25. The communication system of claim 22 wherein said second carrier frequency comprises a carrier frequency on which a global positioning signal is modulated.

26. The communication system of claim 22 wherein said data transactions comprise transactions of digital information modulated according to a method of time division multiple access on said first carrier frequency.

27. A method for improving throughput in a wireless network that includes a mobile station with an antenna that receives wireless signals at one of a first carrier frequency and a second carrier frequency, said mobile station implementing a communication system that has at least two layers including TCP (Transmission Control Protocol) and radio link protocol (RLP), the method comprising:
   tuning said mobile station to a first carrier frequency modulated pursuant to the RLP, and receiving data;
   monitoring RLP data transactions on the first carrier frequency, including monitoring data activity and measuring at least one time period;
   in said mobile station, receiving a request for information available on the second carrier frequency;
   scheduling a tune-away to said second carrier frequency at a time subsequent to a variable time period following receipt of said request, said variable time period selected responsive to said monitoring of RLP transactions; and
   tuning-away said mobile station to said second carrier frequency at said scheduled time, and wherein measuring said at least one time period comprises measuring at least one time period selected from a group of time periods consisting of:
      a lapse of time between said request for information on said second carrier frequency and a previous request for information on said second carrier frequency, and
      a period of time elapsed since receiving said request and a pre-determined maximum time the second carrier frequency can be rejected.

28. The method of claim 27, wherein said monitoring RLP data transactions includes determining if any RLP holes need to be filled, and said scheduling a tune-away includes delaying the tune-away if it is determined that RLP holes need to be filled.

29. The method of claim 27 wherein said receiving data includes receiving digital information transmitted on spread spectrum signals modulated on said first carrier frequency.

30. The method of claim 27 wherein said monitoring includes monitoring data transactions on a supplemental channel.

31. The method of claim 27 wherein said measuring said at least one time period further comprises measuring
   a period of time during which there is a substantial absence of data activity involving said mobile station pursuant to said radio link protocol.

32. The method of claim 27 wherein said second carrier frequency comprises a carrier frequency on which a global positioning signal is modulated.

* * * * *